Figure 1:
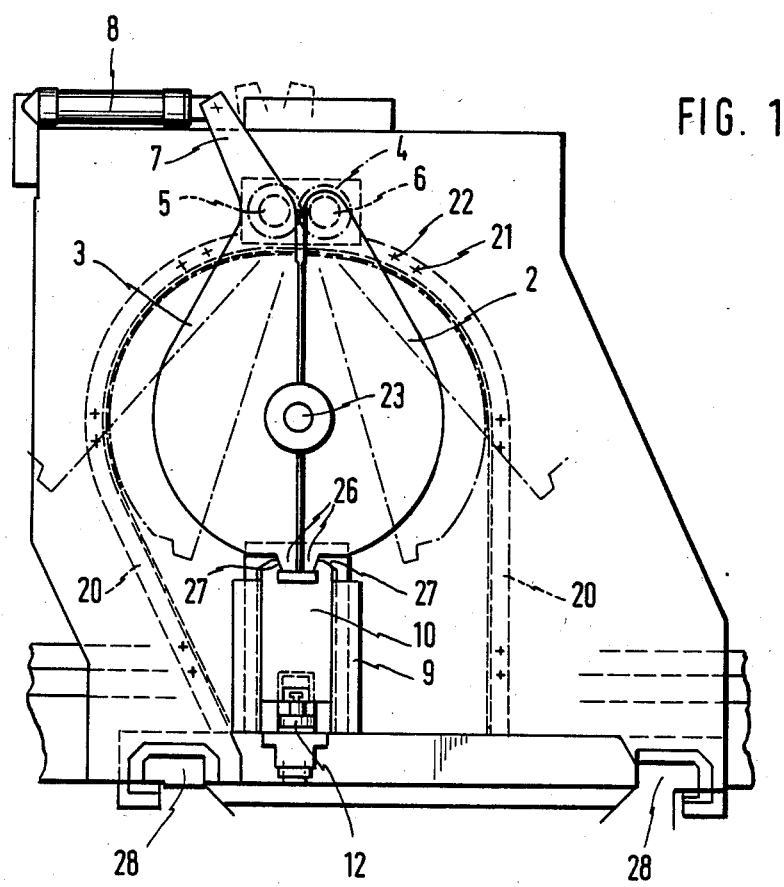

United States Patent [19]

Berbalk

[11] Patent Number: 4,558,978
[45] Date of Patent: Dec. 17, 1985

[54] MACHINE FOR MACHINING CRANKSHAFTS

[75] Inventor: Hermann Berbalk, Göppingen, Fed. Rep. of Germany

[73] Assignee: Oerlikon-Boehringer GmbH, Göppingen, Fed. Rep. of Germany

[21] Appl. No.: 557,141

[22] PCT Filed: Mar. 4, 1983

[86] PCT No.: PCT/EP83/00064
§ 371 Date: Nov. 3, 1983
§ 102(e) Date: Nov. 3, 1983

[87] PCT Pub. No.: WO83/03069
PCT Pub. Date: Sep. 15, 1983

[30] Foreign Application Priority Data

Mar. 5, 1982 [DE] Fed. Rep. of Germany ....... 3208046

[51] Int. Cl.$^4$ ............................................. B23C 3/06
[52] U.S. Cl. ................................. 409/200; 51/238 S; 82/9; 82/39
[58] Field of Search ............... 409/197, 199, 200, 241, 409/203; 82/9, 39, 32, 20; 51/238 S

[56] References Cited

U.S. PATENT DOCUMENTS 2,650,522 9/1953 Godfriaux ........................ 82/39 X
4,180,359 12/1979 Schmid ............................. 409/197

FOREIGN PATENT DOCUMENTS 0576192 10/1977 U.S.S.R. ................................ 82/39

Primary Examiner—Z. R. Bilinsky

[57] ABSTRACT

The invention relates to a machine for machining crankshafts, which operates according to the gyrocutter principle, and which has two machining units and one corresponding clamping device each. In order to be able to provide optimum clamping even for unstable workpieces, such as crankshafts, for example, in which the main journal and crankpin spacing is small, and to catch the chips that are formed and evacuate them easily, the two clamping devices support the crankshaft tightly at the same main journal while two crankpins are being machined.

9 Claims, 5 Drawing Figures

MACHINE FOR MACHINING CRANKSHAFTS

The invention relates to a machine for machining crankshafts operating on the gyrocutter principle having two machining units and one corresponding clamping device each.

A machine of this kind is known from U.S. Pat. No. 4,180,359. This machine has two machining units for machining a crankshaft held at both ends. A clamping device is associated with each machining unit. When closely adjacent crankpins are to be machined, only one of the two clamping devices is used at the main journal situated between the crankpins. The other clamping device is shifted radially outwardly. Support of this kind is sufficient in the case of short crankshafts, but it has the disadvantage that the clamping device that is not in use takes up a considerable amount of radial space.

Particularly in the machining of crankpins, a secure support directly adjacent the point of machining is necessary, because, on account of the leverage, the cutting forces produce a great torque on the crankshaft. Due to the trend towards ever smaller motors, especially in the automotive field, the crankshafts are being made increasingly more compact. The spacing between the crankpins and main journals is becoming ever shorter, and the cranks between them ever thinner; the workpiece becomes consequently less stable. Furthermore, the trend toward faster machining necessitates a higher cutting performance. As a result, the need for optimum support directly adjacent the cutting point is acute. As a result of the very small amount of space available, it is therefore necessary, especially if inwardly situated crankpins are being machined at the same angular position, to achieve a good evacuation of the chips. Furthermore, the two machining units are so close to one another in the machining of the inner crankpins that there is no space in the very tight interstice for two clamping devices for the production of two stable additional holding points. In this narrow interstice, however, assurance must be obtained that the crankshaft is held perfectly steady, that the outwardly flying chips are caught, and a greater chip space is present for the removal of the chips from the machining area. If, however, the crankpins situated further outwardly are being machined, that is, if a relatively great distance is present between the machining units, then the clamping device associated with each machining unit must satisfy the above-named requirements, doing so directly at the main journal situated directly beside the crankpin being machined.

The invention therefore sets out from the technical problem that such machines must be designed such that unstable workpieces, such as crankshafts for example, in which the distance between the crankpin and main journal is small, can be clamped up in an optimum manner, and the chips can be caught and removed reliably.

This technical problem is solved in accordance with the invention by having two clamping devices clampingly support the crankshaft at the same main journal during the machining of two crankpins.

It has been found that it is possible to construct the clamping devices and the machining units such that both clamping devices engage the same main journal when crankpins closely adjacent to one another are being machined. In this manner, particularly in the case of unstable crankshafts of compact construction, having thin webs and short spacing between main journals, optimum clamping, chip catching and chip evacuation conditions can be created. The clamping devices can be constructed such that they are simple and stable, and in this manner cheaper methods of production and low manufacturing costs can be achieved.

Figure 2:
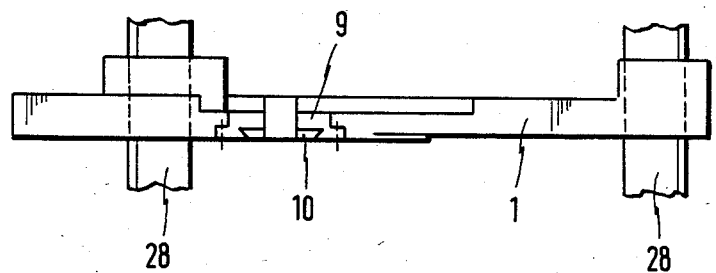
Figure 3:
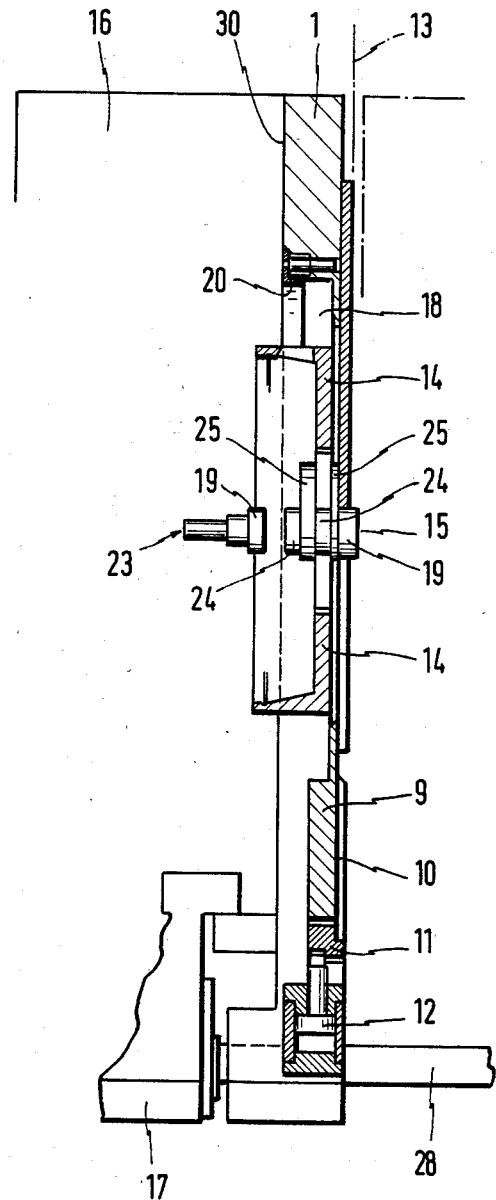
Figure 4:
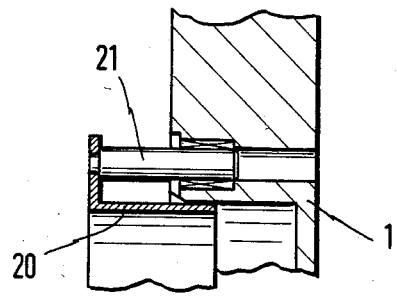
Figure 5:
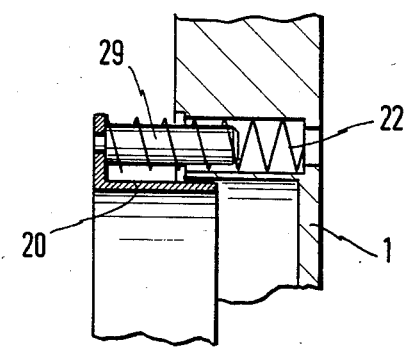

The invention is explained below by way of example, in conjunction with FIGS. 1 to 5, wherein:

FIG. 1 is a side view of a clamping device of the machine for machining crankshafts, FIG. 2 is a top view of the clamping means, FIG. 3 is a vertical section of the clamping means, and FIGS. 4 and 5 show the mounting of a sealing bar.

The illustrated machine for machining crankshafts serves for the machining of a six-throw crankshaft 23, of which only the left half, symmetrical with the line of symmetry 13, is shown in FIG. 3. The crankshaft has main journals 19, crankpins 24, and webs 25. For the machining of the right-hand crankpin 24 in FIG. 3, a machining unit is provided in the form of a gyrocutter 16 whose right end surface 30 terminates ahead of the crankpin 24 on the left in FIG. 3.

The gyrocutter bears, in a known manner, tools 14 which, however, are of a cranked configuration, i.e., project beyond the end surface 30. The tools can have openings for the evacuation of the chips that are produced.

With the gyrocutter 16 there is associated a clamping device having a base body 1 which is disposed at only a very slight distance from the cutter 16. Two jaws 2 and 3 are pivotally mounted, as shown especially in FIG. 1, on pins 6. The jaws 2 and 3 surround the main journal on the right in FIG. 3, and thereby produce the clamping of the crankshaft 23 as needed in the machining operation.

The two jaws 2 and 3 have at their bottom ends projections 26 provided with ramp surfaces 27 on their outer sides.

A clamping slide 10 is displaceably mounted in a guide 9 on the base body 1 of the clamping device, underneath the jaws 2 and 3. The clamping slide 10 has at its upper end a recess having ramp surfaces corresponding to the ramp surfaces 27 of the projections 26 of the two jaws 2 and 3.

The jaws 2 and 3 have meshed gears 4 and 5 coaxial with the pins 6. The one jaw is prolonged by a lever 7 which is connected to the piston of a hydraulic cylinder 8. By the operation of the hydraulic cylinder 8, the two jaws 2 and 3 can thus be operated, i.e., opened and closed simultaneously. In the closed state the jaws surround the main journal 19 of the crankshaft 23, but have a slight gap between them. The actual clamping movement is produced by means of the clamping slide 10, which when moved upwardly engages the ramp surfaces 27 of the projections 26 of jaws 2 and 3 and tightens the latter against the main journal 19.

The operation of the clamping slide 10 is performed to means of a hydraulic cylinder 12 whose piston operates the clamping slide through a coupling 11.

The chip space 18 formed between the gyrocutter 26 and the base body is closed axially by a sealing rim 20 whose one side is vertical and whose other side is at an angle thereto, as shown in FIG. 1.

The sealing rim 20 is mounted on the base body 1 of the clamping device by means of guide pins 21 (FIG. 4) and compression coil springs 22 on pins 29. The pins 21 and the compression coil springs 22 are distributed in pairs over the length of the sealing rim 20, as indicated by the crossmarks in FIG. 1.

The sealing rim 20 is urged by the compression coil springs against the gyrocutter 16, so that crankshafts can also be machined in which two crankpins are directly adjacent one another, as in the case with so-called split pin designs, so that, in the machining operation, in the case of FIG. 3, the grip on the main journal 15 is maintained when the left-hand main journal is being machined (i.e., in this case no lateral webs are present). The now greater distance between the base body 1 of the clamping device and the gyrocutter 16 is compensated by the displaceability of the sealing rim 20 held on pins 21 and 29.

The base body 1 can be made fixed or displaceable on guides 28 with respect to the bottom part 17 which bears the gyrocutter, so that the clamping device can be brought to the working position required in each case.

In FIG. 3, only the gyrocutter with its corresponding clamping device on the left of the line of symmetry 13 is shown, but the right-hand gyrocutter with its corresponding clamping device is made in the same manner. The jaws of this clamping device close on the same main journal 19 as the jaws 2 and 3 of the left clamping means.

The jaws can have a very slight thickness, because they are able to withstand the radial forces that occur, on account of their large radial dimensions. In the case of short crankshafts, in which the main journals have small axial dimensions, two gyrocutters with the corresponding clamping device can be used for machining directly side by side. In this case, the crankshaft, as it can be seen in FIG. 3, is gripped at the same main journal by both clamping devices and thus is supported in the necessary manner.

On account of the tools of cranked configuration and the gyrocutter set back thereby, a chip space open at the bottom is formed by the gyrocutter and the clamping means, which assures a trouble-free evacuation of the chips that are produced.

I claim:

1. A machine for machining a crankshaft, comprising: the machining units each having a gyrocutter, and each having a clamping device for clampingly supporting a crankshaft at the same main journal when machining two crankpins of the crankshaft adjacent the main journal, each clamping device having two pivotingly mounted jaws for embracing the main journal, a gear being disposed on each jaw, the two gears being in engagement with each other, one of the two jaws being pivotable by a hydraulic cylinder, each jaw having a free end with a projection having a ramp surface, a clamping slide mounted on each clamping device and having ramp surfaces corresponding to the ramp surfaces of the jaws for locking and tightening the jaws, the jaws being arranged above the crankshaft, and the clamping slide being arranged below the crankshaft and displaceable vertically.

2. A machine according to claim 1, wherein one of the jaws is prolonged by a lever which is connected to a piston of the hydraulic cylinder.

3. A machine according to claim 1, wherein the clamping slide is displaceable by a hydraulic cylinder.

4. A machine according to claim 1, wherein each gyrocutter has tools of a cranked configuration and projecting axially beyond the respective gyrocutter, each clamping device having a base body of a thickness greater than the distance between the crankpin of the crankshaft to be machined and the main journal.

5. A machine according to claim 4, wherein between each maching unit and the base body of each clamping device there is disposed a sealing rim which is axially displaceable and bears against the gyrocutter of the respective machining unit.

6. A machine according to claim 5, wherein the sealing rim has pins for guiding the rim in the base body of the respective clamping device.

7. A machine according to claim 6, comprising compression springs biasing the sealing rim against the respective machining unit.

8. A machine according to claim 1, wherein the clamping devices are axially displaceable.

9. A machine according to claim 8, wherein each machining unit has a bottom part, and wherein said clamping devices are guided in the bottom part of the respective machine unit.

* * * * *